United States Patent [19]

Oliver et al.

[11] 3,718,472

[45] Feb. 27, 1973

[54] FILTER DYES FOR PHOTOGRAPHIC ELEMENTS

[75] Inventors: Gene L. Oliver; Judith M. Harbison, both of Rochester, N.Y.

[73] Assignee: Eastman Kodak Company, Rochester, N.Y.

[22] Filed: March 4, 1971

[21] Appl. No.: 120,933

[52] U.S. Cl. ............... 96/84 R, 96/87 R, 117/33.3, 260/240 R
[51] Int. Cl. .................................. G03c 1/84
[58] Field of Search ........................ 96/84 R

[56] References Cited

UNITED STATES PATENTS

| | | | |
|---|---|---|---|
| 3,079,421 | 2/1963 | Martin | 260/464 |
| 3,555,016 | 1/1971 | Peter et al. | 260/240.9 |
| 3,486,897 | 12/1969 | Oliver | 96/84 R |
| 3,652,284 | 3/1972 | Oliver | 96/84 R |

FOREIGN PATENTS OR APPLICATIONS

| | | | |
|---|---|---|---|
| 615,414 | 1/1961 | Italy | 260/240.9 |
| 1,097,421 | 2/1955 | France | 96/84 |

*Primary Examiner*—Ronald H. Smith
*Attorney*—Robert W. Hampton, James R. Frederick and William E. Neely

[57] ABSTRACT

Oxonol, benzylidene and cinnamylidene dyes derived from cyanomethylsulfone compounds are useful as filter dyes, especially for photographic elements. They absorb primarily in the blue region of the spectrum. Bis(methylsulfonylacetonitrile)trimethine oxonol, sodium salt; 2-p-dimethylaminobenzylidene-2-methylsulfonylacetonitrile and 2-p-dimethylaminocinnamylidene-2-methylsulfonylacetonitrile are illustrative of the filter dyes of the invention.

16 Claims, 1 Drawing Figure

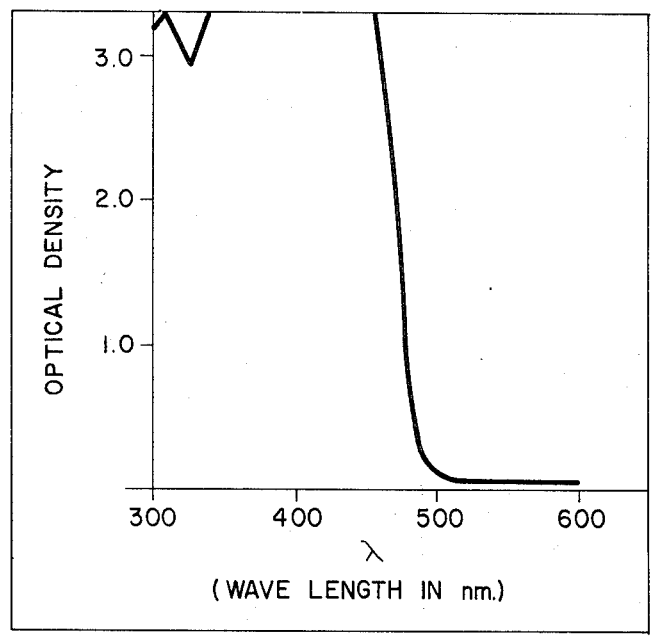
GENE L. OLIVER
JUDITH M. HARBISON
INVENTOR.
BY
William E. Neely
ATTORNEY

FILTER DYES FOR PHOTOGRAPHIC ELEMENTS

This invention relates to dye compounds useful as filter dyes and to photographic elements containing said dyes in a hydrophilic colloid layer.

The dyes of the invention, broadly speaking, are oxonol, benzylidene and cinnamylidene dyes derived from cyanomethylsulfone compounds. They have properties which make them useful and desirable filter dyes. They absorb light primarily in the blue region of the spectrum.

It is an object of our invention to provide a new class of dyes which are valuable for use in making photographic elements.

Another object is to provide a process for preparing the new dyes of our invention.

Another object is to provide photographic elements comprising a support and at least one hydrophilic colloid layer containing a light-sensitive silver halide which is overcoated with a hydrophilic colloid layer containing at least one of the new dyes of our invention.

A further object is to provide a yellow filter layer which survives normal black and white processing essentially unchanged.

The foregoing objects are illustrative and not limitative of the objects of our invention.

The compounds of our invention include those having the formulas:

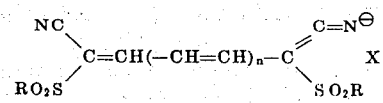

and

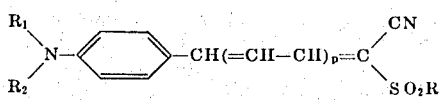

wherein $n$ represents 0, 1 or 2, $p$ represents 0 or 1, each R represents an alkyl group having one to 18 carbon atoms, a carboxyalkyl group having two to 11 carbon atoms, a hydroxyalkyl group having two to 10 carbon atoms, or a phenyl group such as phenyl, a chlorophenyl group, a carboxyphenyl group or an alkyl-(having one to 18 carbon atoms) phenyl group, $R_1$ and $R_2$, are the same or different, and each represents an alkyl group having one to five carbon atoms, a hydroxyalkyl group having two to four carbon atoms, a sulfoalkyl group having two to four carbon atoms, a sulfatoalkyl group having two to four carbon atoms, a carboxyalkyl group having two to five carbon atoms, 2-chloroethyl, 2-bromoethyl or 2-cyanoethyl and X represents hydrogen or a salt-forming cation.

The term "an alkyl group" as used herein and in the claims means an alkyl group having the general formula $C_nH_{2n+1}$ such as methyl, ethyl, propyl, isopropyl, butyl, isobutyl, pentyl, hexyl, heptyl, octyl, nonyl, decyl, undecyl, dodecyl, tetradecyl, hexadecyl or octadecyl, for example.

Carboxymethyl, 2-carboxyethyl, 3-carboxypropyl, 1-carboxybutyl, 4-carboxybutyl, 6-carboxyhexyl, 8-carboxyoctyl and 10-carboxydecyl, for example, are illustrative of the carboxyalkyl groups R can be.

Illustrative hydroxyalkyl groups which R can be include 2-hydroxyethyl, 2-hydroxypropyl, 3-hydroxypropyl, 4-hydroxybutyl, 6-hydroxyhexyl, 8-hydroxyoctyl and 10-hydroxydecyl, for example.

Alkylphenyl groups which R can be include, for example, methylphenyl, ethylphenyl, butylphenyl, hexylphenyl, octylphenyl, decylphenyl and octadecylphenyl.

Methyl, ethyl, propyl, isopropyl, butyl, pentyl, 2-hydroxyethyl, 2-hydroxypropyl, 3-hydroxypropyl, 4-hydroxybutyl, 2-sulfoethyl, 3-sulfopropyl, 3-sulfobutyl, 4-sulfobutyl, 2-sulfatoethyl, 3-sulfatopropyl, 4-sulfatobutyl, carboxymethyl, 2-carboxyethyl, 3-carboxypropyl, 4-carboxybutyl, 2-chloroethyl, 2-bromoethyl and 2-cyanoethyl, for example, are illustrative of the groups each of $R_1$ and $R_2$ can be.

The oxonol compounds of our invention having the formula I wherein $n$ is 1 can be prepared by reacting a cyanomethylsulfone compound with trimethoxypropene in the presence of a basic condensing agent such as a trialkylamine, e.g., triethylamine, tri-n-propylamine, tri-n-butylamine, etc., N-methylpiperidine, N-ethylpiperidine, N,N-diethylaniline, etc.

Oxonol compounds having the formula I wherein $n$ is 2 can be prepared by reacting a cyanomethylsulfone compound with glutaconaldehyde dianil hydrochloride in the presence of a basic condensing agent such as those named hereinbefore.

The preparation of compounds having the formula I is illustrated in Examples 1, 2 and 3. The preparation of compounds having the formula II is illustrated in Examples 4 and 5.

The reactions used in preparing the compounds having the formulas I and II are conveniently carried out in the presence of an inert solvent medium, for example, an alkanol such as methanol, ethanol, propanol or butanol, acetone, 1,4-dioxane, pyridine, dimethylformamide, dimethylacetamide, quinoline, and the like, at elevated temperatures. The desired compounds formed are separated from the reaction mixtures using known procedures illustrated in Example 1–5 and can be purified in known fashion by one or more recrystallizations from suitable solvents such as the solvents named hereinbefore.

The cyanomethylsulfone compounds used in preparing the compounds of our invention have the formula $R-SO_2-CH_2CN$ wherein R is as previously defined and can be prepared, for example, by the general method of Dijkstra and Backer, Rec. Trav. Chim., 73,559 (1954).

The following examples further illustrate our invention.

Example 1. — Bis(methylsulfonylacetonitrile)trimethine oxonol, sodium salt

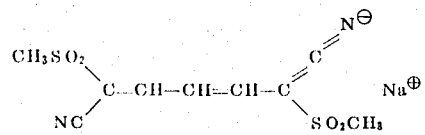

Methylsulfonylacetonitrile (2.38 g, 0.02 mol), trimethoxypropene (2.64 g. 0.02 mol), pyridine (10 ml), and triethylamine (2.8 ml) were heated together on a steam bath for 30 minutes. After cooling, the product was thrown out of solution by dilution with ether. The liquid was decanted and the residue taken up in ethanol. A concentrated solution of 1.5 g sodium iodide in ethanol was added, whereupon crystals of the dye separated. The precipitate was filtered off, washed with ethanol, and dried. The dye (1.66 g, 56 percent yield) was recrystallized twice from methanol, yielding pure dye, m.p. 277°–8°C. dec.

Example 2. — Bis(methylsulfonylacetonitrile)methine oxonol, pyridine salt

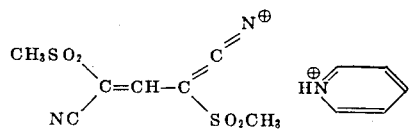

Methylsulfonylacetonitrile (2.38 g, 0.02 mol), diethoxymethyl acetate (3.24 g, 0.02 mol) and pyridine (2.1 ml, 0.015 mol) were refluxed for 5 minutes. After cooling, the product was thrown out of solution by dilution with ether. This residue was stirred with a little ethanol; and the resulting solid was filtered off, washed with ethanol and dried. The yield was 1.85 g (57 percent). After two recrystallizations from ethanol, a white solid, m.p. 138°–139°C., was obtained.

Example 3.  Bis(n-dodecylsulfonylacetonitrile)trimethine oxonol, sodium salt

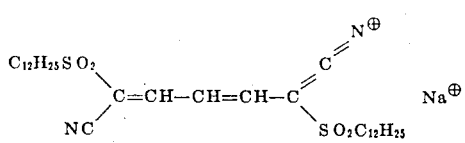

Dodecylsulfonylacetonitrile (8.0 g, 0.029 mol), trimethoxypropene (4.8 g, 0.036 mol), triethylamine (4.8 ml) and ethanol (30 ml) were refluxed for 21 hrs. The solvent was evaporated off and 10 ml methanol and a solution of 2.5 g sodium iodide in 5 ml methanol added. The solution was chilled yielding a dark solid which was filtered off, washed with ether, and dried. The yield was 5.4 g (64 percent). Three recrystallizations from acetonitrile (using Norit) gave a red-yellow solid, m.p. 250°C. dec., which remained as a single spot in a thin-layer chromatogram and in a paper electrophoresis. Example 4. — 2-p-Dimethylaminobenzylidene-2-methylsulfonylacetonitrile

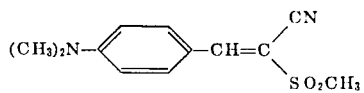

Methylsulfonylacetonitrile (1.19 g, 0.01 mol), p-dimethylaminobenzaldehyde (1.49 g, 0.01 mol), and triethylenediamine ("DABCO"), (0.2 g) were dissolved in hot ethanol (10 ml) and refluxed for 15 min. The product separated from solution on cooling, yielding 1.25 g (50 percent) of dry dye. After two recrystallizations from ethanol, the m.p. of the yellow, fluorescent dye was 139°–141°C.

Example 5. — 2-p-Dimethylaminocinnamylidene-2-methylsulfonylacetonitrile

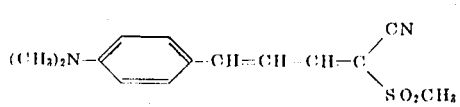

Methylsulfonylacetonitrile (1.19 g, 0.01 mol) and p-dimethylaminocinnamaldehyde (1.75 g, 0.01 mol) were dissolved in hot ethanol and 7 drops of piperidine added. After refluxing for 3 min., the mixture was chilled with scratching to initiate crystallization. After standing in a refrigerator overnight, the mixture was filtered and the residue dried. The yield was 2.18 g (79 percent). The dye was recrystallized twice by dissolving in a minimum volume of hot pyridine and precipitating with 3 volumes of methanol, m.p. 156.5°–158°C.

Example 6 — The absorption maxima in methanol solution of the dyes of Examples 1–5 are shown in the following table:

| Dye of Example | λ max (nm) | Extinction Coefficient (×10$^{-4}$) |
|---|---|---|
| 1 | 413 | 8.9 |
| 2 | 319 | |
| 3 | 415 | 9.6 |
| 4 | 414 | 4.7 |
| 5 | 462 | 5.1 |

The oxonol dyes of Examples 1 and 3, dissolved in acetone and aqueous acetone respectively, were added to separate aqueous gelatin solutions along with saponin as the spreading agent. They were coated at approximately 20 mg/ft$^2$ (2.2 mg/dm$^2$) of dye and 800 mg of gelatin/ft$^2$ (87 mg/dm$^2$) on cellulose acetate film base. Both dyes absorbed blue light with a maximum at 420 nm. The dye of Example 1 could be washed from the coating readily by D–19 developer or plain water. The dye of Example 3 survived photographic processing in D–19 developer (3 min.) and fixing in F–5 fixer (5 min.) with a loss only from 2.3 to 2.2 in optical density.

Example 7

A mixture of 1.0 g. of 2-(3,5-di-tert-butyl-2-hydroxyphenyl)-2H-benzotriazole and 400 mg. of diethyl[(3-ethyl-2-benzothiazolinylidene)ethylidene]malonate dissolved in a mixture of 0.5 ml. of N-n-butylacetanilide and 2.5 ml. of ethyl acetate was dispersed in 52 ml. of an aqueous 6.5 percent gelatin solution containing 1.5 ml. of an aqueous saponin solution. The dispersion thus obtained was chill-set and dried and then redispersed in 71 ml. of water. To the dispersion thus obtained 10 ml. of an aqueous methanol solution of 400 mg. of 2-(3-cyano-3-dodecylsulfonylallylidene)-3-(3-sulfopropyl)thiazolidine, sodium salt, and 10 ml. of an aqueous acetone solution containing 200 mg. of the dye of Example 3 were added and water was added to make 100 grams of the dispersion. The dispersion, in uniform condition, was coated on a cellulose acetate film support at the rate of 10 grams per sq. ft. and overcoated with a thin gelatin layer. The yellow filter layer thus obtained simulates the spectral characteristics of a Wratten 4 filter and remains essentially unchanged in optical density when subjected to D–19 developer for 3 minutes, F–5 fixer for 3 minutes and a 5 minute water wash. The absorption spectrum of the combined filter layer and cellulose acetate support is shown in the drawing.

Diethyl[(3-ethyl-2-benzothiazolinylidene)ethylidene]-malonate is homologous to ethyl N-methylbenzothiazolylidene-2-ethylidene malonate which can be prepared as described in Example 13 of U.S. Pat. No. 2,956,878. It can be prepared by substituting an equivalent amount of 3-ethyl-2-methylbenzothiazolium iodide for 2-methylbenzothiazole methyl iodide (i.e., 2,3-dimethylbenzothiazolium iodide) in said Example 13.

The preparation of the compound 2-(3-cyano-3-dodecylsulfonylallylidene-3-(3-sulfopropyl) thiazolidene, sodium salt will be apparent from Example 9 of U.S. Pat. No. 3,486,897 wherein the potassium salt is prepared.

Yellow filter layers duplicating or substantially duplicating the spectral characteristics of a Wratten 4 filter can also be obtained by substituting equivalent amounts of 2-(2-hydroxy-5-isooctyl phenyl)-2H-benzotriazole, 2-(2-hydroxy-3,5-di-tert-pentylphenyl)-2H-benzotriazole or 2-(2-hydroxy-5-dodecylphenyl)-2H-benzotriazole for 2-(3,5-di-tert-butyl-2-hydroxyphenyl)-2H-benzotriazole in Example 7.

Similarly equivalent amounts of 2-(3-cyano-3-dodecylsulfonylallylidene)-3-ethylthiazolidine; 2-(3-cyano-3-methylsulfonylallylidene)-3-(3-sulfopropyl)thiazolidine, sodium salt or 2-[3-(10-carboxydecylsulfonyl)-3-cyanoallylidene]-3-(3-sulfopropyl)thiazolidine, disodium salt can be substituted for 2-(3-cyano-3-dodecylsulfonylallylidene)-3-(3-sulfopropyl) thiazolidine, sodium salt; equivalent amounts of bis(methylsulfonylacetonitrile)trimethine oxonol, pyridine salt; bis(p-nonylphenylsulfonylacetonitrile)tri methine oxonol, sodium salt or bis(5-carboxypentylsulfonylacetonitrile)trimethine oxonol, trisodium salt can be substituted for bis(dodecylsulfonylacetonitrile)t rimethine oxonol, sodium salt and equivalent amounts of diethyl {[3-(3-sulfopropyl)-2-benzothiazolinylidene]ethylidene}malonate, sodium salt or dibutyl[(3-ethyl-2-benzothiazolinylidene)ethylidene]malonate can be substituted for diethyl[(3-ethyl-2-benzothiazolinylidene)ethylidene]malonate in Example 7 to obtain yellow filter layers duplicating or substantially duplicating the spectral characteristics of a Wratten 4 filter. It will be appreciated that any combination of the dye compounds involved can be employed provided that all 4 types of dye compounds are present in the combination and in the amounts taught by Example 7. If desired, more than one dye of the same type can be present in the combination, e.g., a half equivalent amount of 2-(2-hydroxy-5-isooctyl phenyl)-2H-benzotriazole and a half equivalent amount of 2-(2-hydroxy-3,5-di-tert-pentylphenyl)-2H-benzotriazole.

By the use of an equivalent amount of glutaconaldehyde dianil hydrochloride in place of trimethoxypropene in Example 1 bis(methylsulfonylacetonitril e)pentamethine oxonol, sodium salt can be obtained.

It will be understood that the compounds of our invention specifically disclosed hereinbefore are illustrative and not limitative of our invention. Thus, bis(ethylsulfonylacetonitrile)methine oxonol, pyridine salt; bis(ethylsulfonylacetonitrile)trimethine oxonol, sodium salt; bis(carboxymethylsulfonylacetonitri le)trimethine oxonol, sodium salt; bis(n-butylsulfonylacetonitrile)trimethine oxonol, sodium salt; bis(phenylsulfonyl acetonitrile)trimethine oxonol, sodium salt; 2-p-diethylaminobenzylidene-2-methylsulfonylacetonitrile; 2-p-di-n-butylaminobenzylidene-2-methylsulfonylacetonitrile; 2-p-dimethylaminobenzylidene-2-ethylsulfonylacetonitrile; 2-p-dimethylaminobenzylidene-2-n-butylsulfonylacetonitrile; 2-p-dimethylaminocinnamylidene-2-ethylsulfonylacetonitrile; 2-p-dimethylaminocinnamylidene-2-n-butylsulfonylacetonitrile; 2-p-diethylaminocinnamylidene-2-methylsulfonylacetonitrile; 2-p-di-n-butylaminocinnamylidene-2-methylsulfonylacetonitrile; etc., for example, are compounds of our invention which can be prepared in accordance with the procedures described and illustrated hereinbefore.

When X represents a salt-forming cation it can be an alkali metal ion such as $NA^+$, $K^+$, $Li^+$, etc.; an ammonium ion such as ammonium, trimethylammonium, triethylammonium, tetramethylammonium, tetraethylammonium, benzyltrimethylammonium, a piperidinium ion (e.g., piperidinium, N-methylpiperidinium, N-ethylpiperidinium), a morpholinium ion (e.g. morpholinium) or a pyrrolidinium ion (e.g., pyrrolidinium), for example, or a cyclic immonium ion such as a pyridinium ion (e.g., pyridinium, $\alpha$-methylpyridinium, $\beta$-methylpyridinium, $\gamma$-methylpyridinium, N-methylpyridinium, N-ethylpyridinium, etc.) or a quinolinium ion (e.g., quinolinium, N-methylquinolinium, N-ethylquinolinium, etc.), for example.

It will be understood that the compounds having a salt-forming cation can have any of the salt-forming cations set forth hereinbefore.

By replacing the gelatin overcoat layer of Example 7 with a light-sensitive silver halide photographic emulsion, a photographic film, such as microfilm, for example, containing a non-removable yellow antihalation layer is obtained. The film can be overcoated with a protective hydrophilic colloid layer such as a gelatin layer, if desired.

A Wratten 4 filter is one of a number of filters made by the Eastman Kodak Co., Rochester, New York for scientific and technical uses. Wratten, D–19 and F–5 are trademarks of the Eastman Kodak Co., Rochester, New York.

The invention has been described in considerable detail with particular reference to certain preferred embodiments thereof, but it will be understood that variations and modifications can be effected within the spirit and scope of the invention as described hereinbefore.

We claim:

1. A photographic element comprising a support, at least one hydrophilic colloid layer containing light-sensitive silver halide and at least one hydrophilic colloid layer containing a compound selected from those having the formulas:

I 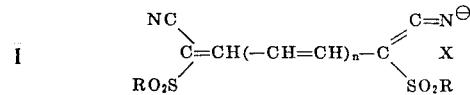

and

II 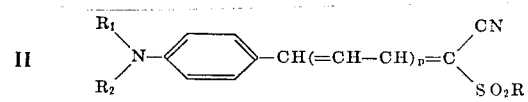

wherein n represents 0, 1 or 2, p represents 0 or 1, each R represents an unsubstituted alkyl group having one to 18 carbon atoms, a carboxyalkyl group having two to 11 carbon atoms, a hydroxyalkyl group having two to 10 carbon atoms or a phenyl group, $R_1$ and $R_2$, are the same or different, and each represents an unsubstituted alkyl group having one to five carbon atoms, a hydroxyalkyl group having two to four carbon atoms, a sulfoalkyl group having two to four carbon atoms, a sulfatoalkyl group having two to four carbon atoms, a carboxyalkyl group having two to five carbon atoms, 2-chloroethyl, 2-bromoethyl or 2-cyanoethyl and X represents hydrogen or a salt-forming cation.

2. A photographic element comprising a support, at least one hydrophilic colloid layer containing light-sensitive silver halide which is overcoated with a hydrophilic colloid layer containing at least one compound having the formula designated I in claim 1.

3. A photographic element in accordance with claim 2 wherein the hydrophilic colloid layers consist essentially of gelatin.

4. A photographic element in accordance with claim 2 comprising a support, at least one hydrophilic colloid layer containing light-sensitive silver halide which is overcoated with a hydrophilic colloid layer containing at least one compound having the formula:

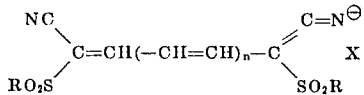

wherein n represents 0, 1 or 2, each R represents an unsubstituted alkyl group having one to 18 carbon atoms, a carboxyalkyl group having two to 11 carbon atoms, a hydroxyalkyl group having two to 10 carbon atoms, phenyl, a chlorophenyl group, a carboxyphenyl group or an (unsubstituted alkyl having one to 18 carbon atoms) phenyl group.

5. A photographic element in accordance with claim 4 wherein the hydrophilic colloid layers consist essentially of gelatin.

6. A photographic element comprising a support, at least one hydrophilic colloid layer containing light-sensitive silver halide which is overcoated with a hydrophilic colloid layer containing at least one compound having the formula designated II in claim 1.

7. A photographic element in accordance with claim 6 wherein the hydrophilic colloid layer consists essentially of gelatin.

8. A photographic element in accordance with claim 1 comprising a support, at least one hydrophilic colloid layer containing light-sensitive silver halide which is overcoated with a hydrophilic colloid layer containing at least one compound having the formula

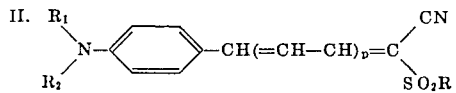

wherein p represents 0 or 1, each R represents an unsubstituted alkyl group having one to 18 carbon atoms, a carboxyalkyl group having two to 11 carbon atoms, a hydroxyalkyl group having two to 10 carbon atoms, phenyl, a chlorophenyl group, a carboxyphenyl group or an (unsubstituted alkyl having one to 18 carbon atoms)phenyl group, $R_1$ and $R_2$, are the same or different, and each represents an unsubstituted alkyl group having one to five carbon atoms, a hydroxyalkyl group having two to four carbon atoms, a sulfoalkyl group having two to four carbon atoms, a sulfatoalkyl group having two to four carbon atoms, a carboxyalkyl group having two to five carbon atoms, 2-chloroethyl, 2-bromoethyl or 2-cyanoethyl and X represents hydrogen or a salt-forming cation.

9. A photographic element in accordance with claim 8 wherein the hydrophilic colloid layers consist essentially of gelatin.

10. A photographic element in accordance with claim 1 wherein said compound in its sodium salt form is bis(methylsulfonylacetonitrile) trimethineoxonol, sodium salt.

11. A photographic element in accordance with claim 1 wherein said compound in its pyridine salt form is bis(methylsulfonylacetonitrile)methineoxonol, pyridine salt.

12. A photographic element in accordance with claim 1 wherein said compound in its sodium salt form is bis(dodecylsulfonylacetonitrile)trimethineoxonol, sodium salt.

13. A photographic element in accordance with claim 1 wherein said compound is 2-p-dimethylaminobenzylidene-2-methylsulfonylacetonitrile.

14. A photographic element in accordance with claim 1 wherein said compound is 2-p-dimethylaminocinnamylidene-2-methyl-sulfonylacetonitrile.

15. A photographic element comprising a support and a uniform yellow hydrophilic colloid layer containing per square foot of the support the equivalent of 100 mg. of 2-(3,5-di-tert-butyl-2-hydroxyphenyl)-2H-benzotriazole selected from one or more of the compounds 2-(3,5-di-tert-butyl-2-hydroxyphenyl)-2H-benzotriazole, 2-(2-hydroxy-5-isooctylphenyl)-2H-benzotriazole, 2-(2-hydroxy-3,5-di-tert-pentylphenyl)-2H-benzotriazole and 2-(2-hydroxy-5-dodecylphenyl)-2H-benzotriazole; the equivalent of 40 mg. of diethyl[(3-ethyl-2-benzothiazolinylidene)ethylidene]-malonate selected from one or more of the compounds diethyl [(3-ethyl-2-benzothiazolinylidene)ethylidene]malonate, diethyl [(3-(3-sulfopropyl-2-benzothiazolinylidene)ethylidene]malonate, sodium salt and dibutyl[(3-ethyl-2-benzothiazolinylidene) ethylidene]malonate; the equivalent of 40 mg. of 2-(3-cyano-3-n-dodecylsulfonylallylidene)-3-(3-sulfopropyl)thiazolidine, sodium salt selected from one or more of the compounds 2-(3-cyano-3-n-dodecylsulfonylallylidene)-3-(3-sulfopropyl)thiazolidine, sodium salt; 2-(3-cyano-3-n-dodecylsulfonylallylidene)-3-ethylthiazolidine, 2-(3-cyano-3-methylsulfonylallylidene)-3-(3-sulfopropyl)thiazolidine, sodium salt and 2-[3-10-carboxydecylsulfonyl)-3-cyanoallylidene]-3-(3-sulfopropyl)thiazolidine, disodium salt, and the equivalent of 20 mg. of bis(n-dodecylsulfonylacetonitrile)-trimethine oxonol, sodium salt selected from one or more of the compounds bis(n-dodecylsulfonylacetonitrile)trimethine oxonol, sodium salt; bis(methylsulfonylacetonitrile)trimethine oxonol, pyridine salt; bis(p-nonylphenylsulfonylacetonitrile)trimethine oxonol, sodium salt and bis(5-carboxypentylsulfonylacetonitrile)-trimethine oxonol, trisodium salt wherein the yellow gelatin colloid layer is overcoated with a gelatin layer containing light-sensitive silver halide.

16. A photographic element comprising a support made of cellulose acetate and a uniform yellow hydrophilic colloid layer consisting essentially of gelatin and containing per square foot of the support 100 mg. of 2-(3,5-di-tert-butyl-2-hydroxyphenyl)-2H-benzotriazole, 40 mg. of diethyl[(3-ethyl-2-benzothiazolinylidene)ethylidene]malonate, 40 mg. of 2-(3-cyano-3-n-dodecylsulfonylallylidene)-3-(3-sulfopropyl)thiazolidine, sodium salt and 20 mg. of bis(n-dodecylsulfonylacetonitrile)-trimethine oxonol, sodium salt wherein the yellow gelatin colloid layer is overcoated with a gelatin layer containing light-sensitive silver halide.

* * * * *